L. G. E. BUEHLER.
POWER TRANSMISSION GEAR.
APPLICATION FILED JAN. 29, 1920.

1,389,622.  Patented Sept. 6, 1921.

Inventor
Louis G. E. Buehler

UNITED STATES PATENT OFFICE.

LOUIS G. E. BUEHLER, OF CHICAGO, ILLINOIS.

POWER-TRANSMISSION GEAR.

1,389,622.  Specification of Letters Patent.  Patented Sept. 6, 1921.

Application filed January 29, 1920. Serial No. 354,782.

*To all whom it may concern:*

Be it known that I, LOUIS G. E. BUEHLER, citizen of the United States, residing at Chicago, in the county of Cook and State of Illinois, have invented certain new and useful Improvements in Power-Transmission Gears; and I do hereby declare that the following is a full, clear, and exact description of the invention, such as will enable others skilled in the art to which it appertains to make and use the same.

This invention relates to power transmission gears and more particularly to speed reducing gears. It has for its main object to provide a gear of this character wherein the drive or high speed shaft extends at right angles to the low speed shaft or shafts.

It has for its further object to provide a speed reducing gear wherein the power of the drive shaft is transmitted to two low speed shafts adapted to be driven at respectively different speeds.

Figure 1:
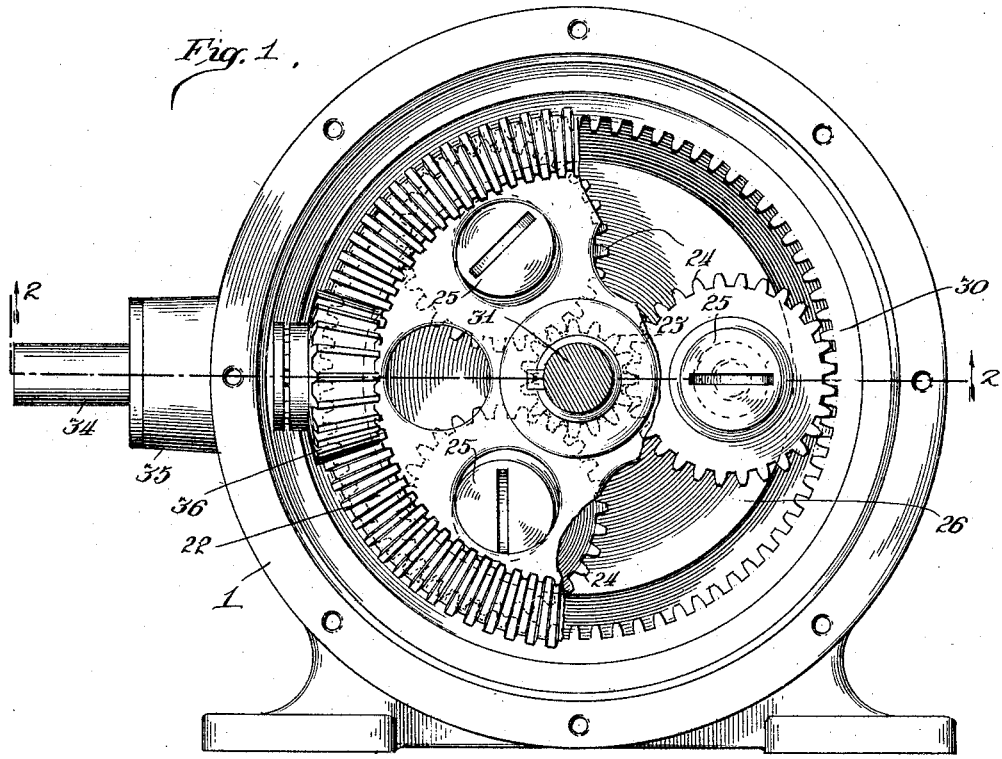
Figure 2:
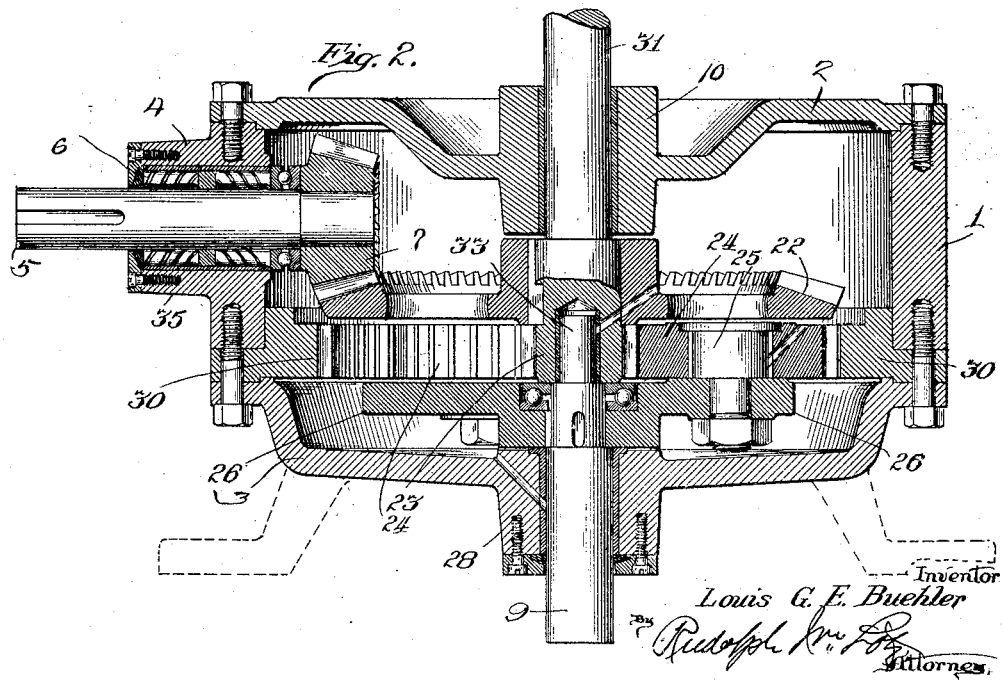

Suitable embodiments of the invention, which consists in the features of construction and combination of parts hereinafter fully described and particularly claimed, are illustrated in the accompanying drawings in which:

Figure 1 is a fragmentary view of a power transmission gear constructed in accordance with my invention, one head or side plate being removed; and Fig. 2 is a horizontal central section along the line 2—2 of Fig. 1.

The device comprises a suitable housing consisting of a cylindrical portion 1 equipped at opposite ends with end plates or heads 2 and 3 respectively, which may be of any desired form to best adapt the same to the particular gear ratio desired, and the width of face of the various gear elements employed. Mounted on or preferably integral with the cylindrical wall of the housing is a bearing 4 for the high speed or drive shaft 5 which, in the instance illustrated, is shown as equipped with roller bearings 6 and suitable thrust bearing elements. This shaft is provided at its inner end with a bevel pinion 7 which meshes with a bevel gear 8 rigid with a spur pinion 23 projected in a direction opposite to its bevel gear face which meshes with a plurality of planetary idle spur pinions 24 rotatably mounted on stud shafts 25 carried by the rotatable element 26 keyed to the shaft 9 journaled in the bearing 28 of the end plate 3 of the housing. Rigid with the latter is an internal gear 30 with which the planetary gears 24 mesh.

The bevel gear 22 is keyed to the shaft 31 journaled in the bearing 10 in the other end plate or head of the housing, and this shaft preferably is integral with the spur pinion 23 and is provided with a central recess or bearing concentric and within said spur pinion and in which the reduced inner end portion 33 of the low speed shaft is suitably journaled. The high speed shaft 5 which is journaled in the bearing 4 projecting from the cylindrical wall of the housing carries the bevel pinion 7 which meshes with the bevel gear 22 and effects rotation of the same and the shaft 31 and spur pinion 23. Thus the spur gears 24 which mesh with the internal gear 20 are caused to rotate, thereby effecting rotation of the plate 26 and shaft 9 at a considerably lower speed than the shaft 31. The gear ratio between the shaft 5 and shaft 9 will be determined by the respective pitch diameters of the spur pinion 23 and the internal gear 30 multiplied by the gear ratio existing between the bevel pinion 7 and the bevel gear 22.

While I have shown the preferred embodiment of the invention in the accompanying drawings, it will be understood, of course, that such embodiment is capable of variation in details of construction to adapt the same to various purposes and location without departing from the invention as defined in the appended claims.

For example, in some instances the lack of space may require that the drive shaft 5 must extend at other than a right angle to the driven shaft 31. In such case obviously the nature of the gear elements 7 and 22 may be changed to suit the conditions.

It will also be obvious that in some instances it may be desired that the low speed shaft 27 should extend entirely through the housing so as to drive therefrom at opposite ends. It will be entirely within the skill of any mechanic to adapt the construction to such conditions, and thus various other changes and adaptations may be effected without departing from the teachings of the foregoing disclosure.

I claim as my invention.

1. In a speed reducing gear, a casing, alined bearings in the casing, power transmission shafts in the bearings, a third shaft arranged at an angle to said first shafts, a bevel pinion on the third shaft, a bevel gear meshing with the pinion and fixed on the inner end of one of the alined shafts for rotating same, a flange fixed on the other of said alined shafts, a gear element rigid with the casing, a pinion concentric with and fixed to the bevel gear, and planetary gears carried by said flange and operably interposed between said gear element and said concentric pinion for rotating said second alined shaft at a less speed than the first alined shaft.

2. In a speed reducing gear, a casing, alined bearings in the casing, power transmission shafts in the bearings, a third shaft arranged at an angle to said first shafts, a bevel pinion on the third shaft, a bevel gear on the inner end of one of the alined shafts meshing with said pinion, a flange fixed on the other of said alined shafts, a gear element rigid with the casing, a pinion concentric with said bevel gear and integral with the first shaft, and planetary gears carried by said flange and operably interposed between the gear element and said concentric pinion for rotating said second alined shaft at a less speed than the first alined shaft.

3. In a speed reducing gear, a casing, alined bearings in the casing, power transmission shafts in the bearings, a third shaft arranged at an angle to said first shafts, a bevel pinion on the third shaft, a bevel gear on the inner end of one of the alined shafts for rotating same, a flange fixed on the other of said alined shafts, a gear element rigid with the casing, a pinion concentric with said bevel gear and integral with the first shaft, the second alined shaft having an end reduced in diameter and fitting within a bearing in the pinion end of the first alined shaft, and planetary gears carried by said flange and operably interposed between the gear element and said concentric pinion for rotating said second alined shaft at a less speed than the first alined shaft.

4. In a right angle speed reducing mechanism, a casing, a power supply shaft rotatable in the casing, a bevel pinion fixed to the inner end of said shaft, two alined bearings in the casing arranged at right angles to said power supply shaft, a power delivery shaft in one of the said alined bearings, a bevel gear on the inner end thereof meshing with said bevel pinion for rotating said shaft, a second power delivery shaft in the other of said alined bearings, a pinion integral with the inner end of said second shaft, a gear element rigid with the casing, and planetary gears carried by the second power delivery shaft operably interposed between the pinion and the gear element for rotating the second shaft at a relatively low speed.

LOUIS G. E. BUEHLER.